United States Patent [19]
Cribbs et al.

[11] Patent Number: 5,541,784
[45] Date of Patent: *Jul. 30, 1996

[54] BOOTSTRAP METHOD FOR WRITING SERVO TRACKS ON A DISK DRIVE

[75] Inventors: Daniel F. Cribbs, 126 Vasona Oaks Dr., Los Gatos, Calif. 95030; John W. Hassler, Jr., Hollister, Calif.

[73] Assignee: Daniel F. Cribbs

[ * ] Notice: The term of this patent shall not extend beyond the expiration date of Pat. No. 5,448,429.

[21] Appl. No.: 342,587

[22] Filed: Nov. 21, 1994

Related U.S. Application Data

[63] Continuation-in-part of Ser. No. 274,676, Jul. 12, 1994, Pat. No. 5,448,429, which is a continuation of Ser. No. 974,255, Nov. 10, 1992, abandoned.

[51] Int. Cl.$^6$ .................................................. G11B 5/012
[52] U.S. Cl. ...................... 360/75; 360/77.04; 360/77.06
[58] Field of Search ................................. 360/75, 77.08, 360/48, 51, 77.04, 77.05, 77.06

[56] References Cited

U.S. PATENT DOCUMENTS

| | | | |
|---|---|---|---|
| 4,414,589 | 11/1983 | Oliver et al. | 360/77.07 |
| 4,536,809 | 8/1985 | Sidman | 360/77.04 |
| 5,241,433 | 8/1993 | Anderson et al. | 360/77.04 |
| 5,379,171 | 1/1995 | Morehouse et al. | 360/105 |
| 5,416,652 | 5/1995 | Lewis | 360/48 |
| 5,448,429 | 9/1995 | Cribbs et al. | 360/75 |
| 5,485,322 | 1/1996 | Chainer et al. | 360/51 |

OTHER PUBLICATIONS

Fowler and Granger–Brown, "Regenerative Clock Technique for Servo Track Writers," IBM Technical Disclosure Bulletin, vol. 33, No. 5, pp. 310–11.

*Primary Examiner*—Aristotelis Psitos
*Assistant Examiner*—James T. Wilson
*Attorney, Agent, or Firm*—David E. Newhouse, Esq.

[57] ABSTRACT

A method for defining and writing parallel and concentric magnetic signal tracks to a spinning disk surface of a magnetic data storage disk drive system using the components of the Head Disk Assembly (HDA) implemented by an appropriately programmed digital signal central processing unit (CPU) or micro code in an integrated circuit (IC) and a digital signal random access memory RAM is described wherein an initial magnetic signal track is written under least (minimum) energy equilibrium conditions with undulating boundaries and a meandering center line relative to axes of the spinning disk surface for one revolution of the surface. Then servoing to an edge of the just written track, a digitized position signal table is created in memory for storing digital position signals representing the amplitude of the signals read from n sampling points per disk revolution over a number of disk revolutions, where n is determined with reference to 'Nyquist criteria'. A comparison/demand signal is derived by the CPU for input to the serve controller for each sampling point by first obtaining a target position signal comprising an average of the digitized position signals stored in the memory table and the just read digitized signal for that sampling point and by then comparing that target position signal to the just read digitizing position signals. The resulting current command signal energizing the actuator is normalized, and variation therein thereafter clamped in steps to bring the slider head to a quiet, least energy equilibrium or coast status relative to the spinning disk surface. A second memory table is generated and stores coast digital position signals for the n sampling points for a plurality of coast or least energy disk revolutions. Servo position then is initiated using averaged values in the second memory table such that any position error signal command to the actuator is a response to random noise or forces. Then preserving the least energy equilibrium state to the extent possible, a subsequent track of servo burst pattern is written onto and around the disk and the procedure repeated referencing the edge of the newly written track. A fiducial track concentric with the axes of the spinning disk is defined by each two iterations of the procedure after writing of the initial track. In this manner track densities in excess of 10,000 tracks per inch (track pitches<100 μin.) can be reliably achieved.

18 Claims, 2 Drawing Sheets

BOOTSTRAP METHOD FOR WRITING SERVO TRACKS ON A DISK DRIVE

RELATED APPLICATIONS

This application is a continuation-in-part of application Ser. No. 08/274,676 filed Jul. 12, 1994 in the United States of America by Daniel F. Cribbs, John Wade Hassler, Jr., (Applicants herein) and Michael L. Ellenberger, now U.S. Pat. No. 5,448,429 which in turn is a continuation of application Ser. No. 07/974,255 filed Nov. 10, 1992, now abandoned.

BACKGROUND OF THE INVENTION

1. Field of the Invention

The invention relates generally to magnetic memory storage devices for computers and more specifically to a method of writing embedded servo tracks and/or servo-patterns onto magnetic surfaces of disk drives using the actuator and magnetic read/write transducer of the drive.

2. Description of the Prior Art

Increasing data storage capacity of magnetic memory disk storage devices such as floppy and hard disk drives requires higher track densities or pitch. Such devices typically utilize voice-coils and other types of precision servo-responsive positioning mechanisms for locating a magnetic read/write transducer incorporated into an air bearing slider 'flying' above a spinning disk surface (a slider head) gimbaled at the end of a suspension arm. The slider read/write head both 'writes' magnetic data signals into a magnetically susceptible material of or coating the disk surface and 'reads' magnetic data signals previously recorded/stored in the material or coating. Because the data signals written to and read from a disk surface typically comprise a stream of digital pulses, a mechanism must be provided for the servo positioning mechanisms to determine both radial and angular (circumferential) positions of the slider read/write head relative to the surface of the spinning disk. High storage capacity magnetic memory disk storage devices require magnetically embedded servo tracks pre-recorded on the disk surface to provide positioning signals via the read/write head enabling the precision servo-responsive positioning mechanism to determine and adjust the location of the slider head above the spinning disk surface.

Existing manufacturing techniques for high storage capacity disks normally utilize independent precision servowriter machines for writing the embedded servo tracks on the magnetically susceptible material of or coating on the disk of a head/disk assembly (HDA). Such machines are generally one-of-a-kind precision devices which typically rely on laser driven optical and other feedback mechanisms for establish physical position of a recording head used to write embedded servo tracks. Unfortunately, the combined hysteresis, hysteretic and other error inherent both in independent servo track writing machines and in servo-responsive positioning mechanisms of the HDA preclude track pitches much below 200 μinches (5000 tracks/inch). Moreover, it is impossible to position a dynamic mechanical system such as an HDA within another dynamic mechanical system of an independent servowriter machine without producing mis-positioning error. This is because the servowriter machine is writing coordinate data for the HDA relative to a coordinate system inherent in its dynamic optical, electrical and mechanical components, not the coordinate system inherent in the dynamic electrical and mechanical components of the HDA.

For an explanation of the problems created by mis-positioning errors, and the steps that must be taken to correct for them, reference should be made to US. Pat. No. 4,536,809 issued May 10, 1982, entitled *Adaptive Misposition Correcting Method and Apparatus for Magnetic Disk Servo System*, by Michael Sidman. In particular, Sidman teaches a method for improving the track following capability of the servo-responsive positioning mechanisms locating and maintaining a slider head of an HDA above a track. More precisely, Sidman describes a method for providing corrective electrical signals to servo-responsive mechanisms for adjusting the radial position of the slider head with respect to the disk spin axes for the purpose of maintaining the slider head over the centerline of a track which is not radially concentric with the disk spin axes. According to Sidman the centerline of a track is defined or established by a pre-recorded embedded servo track most probably written on the disk surface by an independent servo writing machine. One of the typical mis-positioning errors described by Sidman is a mechanical disturbance termed spindle 'wobble' or 'runout' due to a difference between an actual track centerline and that effectively seen by the slider head at a fixed distance from the spin axis of the disk surface. Sidman, observes that that difference commonly results from a slight eccentricity in mounting of the disk on its drive spindle and gives rise to a position error signal that has a characteristic sinusoidal wave form with a periodicity identical to the rotation velocity of the disk. However, Sidman does not describe, teach or suggest any method, means or mechanism for eliminating, mitigating, or minimizing such mis-positioning error when writing the embedded servo tracks.

Conventional embedded servo-patterns typically comprise short bursts of a constant frequency signal, termed servo bursts, radially aligned on the disk surface. Typically there are two types of servo bursts, variously termed, each located at a different circumferential position on the disk surface and radially offset one track width relative to the other. [Track width is principally determined by the geometry and dimensions of the flux gap of the slider head but varies as will be explained infra.] The boundary between the radially offset servo bursts define a data track centerline on the surface of the disk, i.e., each data track centerline is radially offset ½ track width relative to the two types of servo bursts embedded in the disk surface. [See FIG. 4. Sidman (supra)] Accordingly, before reading or writing data, typically the slider head is roughly positioned radially near the location of a desired track around the disk typically by counting tracks crossed or by making a linear and angular head velocity determination. At that rough position, the two types of embedded servo bursts pre-written onto the disk surface produce two distinctive signals trains. The amplitudes of those signal trains are compared to produce a difference signal indicating radial position error where the polarity of that signal indicates the direction of radial misalignment. The servo positioning mechanism moves the slider head responsive to the difference signal in the direction indicated by signal polarity until the head is at radial position where the respective signal trains from the two types of servo bursts are equal, At that point the slider head is deemed to be aligned above the data track centerline and data is read from or written to the disk surface.

The radially aligned servo bursts typically establish sector header areas in each data track around the disk surface. There are usually multiple sectors in each data track. The radially aligned servo bursts are supposed to allow the servo-responsive positioning mechanisms to locate and cause the slider head to follow a particular data track center line around the disk where that track is not concentric with the spin axes of the disk surface. Such radially aligned servo bursts also allow the servo-responsive positioning mechanisms to compensate for mechanical mis-positioning errors due to such things as spindle wobble, disk slip, bearing runout thermal expansion/contraction and the like as explained in detail by Sidman, supra.

In order to write the two types of radially aligned servo bursts to a disk surface, some sort of a timing reference, to the spindle of the disk is required. Conventionally the independent servowriter machine includes an auxiliary clock head which writes a reference timing pattern onto the disk surface. The clock head is then used to read that timing pattern to provide necessary timing signals for aligning the servo bursts. Other existing methods for providing the necessary timing reference contemplate external position encoder disks and/or spindle coupled optical encoders. It is also possible to establish a timing reference using the slider head of the HDA.

For example, in *IBM Technical Disclosure Bulletin* Vol. 33, No. 5, October 1990, R. V. Fowler & N. J. Granger-Brown, describes a phase lock loop (PLL) technique for writing servo tracks into a disk surface of a head/disk assembly using the slider head of the assembly. As described, the PLL technique requires a single clock track written at the outer diameter of the data recording surface which is divided into two alternate phases termed A and B respectively. The slider head is then stepped inwardly in a half track increments using each phase alternately as a source of clock (timing) information for writing both servo bursts in the sector headers and further clock signals in the other phase in the data regions following the sector headers. According to Fowler & Granger-Brown, stepping the slider head inward in half track increments assures that the clock information written in the previously written track can be read by the slider head, i.e., bit-to-bit synchronism is maintained between tracks. Phase error due to write/read delay track to track is supposed to be compensated for systematically. The result of the PLL, technique developed by Fowler & Granger-Brown is a radial aligned embedded pattern of the alternate A & B phase signals in the data regions of the disk separated by radially aligned servo bursts which establish sector headers on the surface of the disk.

Another technique for establishing a timing reference on the disk surface is to write a clock track using the HDA slider head again near the outer periphery of the data recording region on the surface of the disk, and then to omit (erase) an integral number of contiguous clock transitions creating a 'once around reference gap' or index. This 'once reference gap' or index can then be propagated inward to subsequent tracks by moving the slider head inwardly in half track increments and writing alternating tracks of A-type and B-type signal bursts synchronous with the clock transitions in the clock track using phase/frequency locking looping techniques. [See Applicant's co-pending application Ser. No 08/274,676 for a more complete explanation of this technique.] Sector information is then typically generated from the 'once around reference gap' or index.

While in theory the PLL technique developed by Fowler & Granger-Brown should result in good embedded alternate phase servo bursts written at different circumferential positions within each sector header radially offset a half track relative to each other, there is no assurance that a particular track centerline around the disk established by the boundaries between the two different servo bursts in the sector headers for that track is concentric with either of the adjacent tracks or even the spin axes of the disk.

Fowler & Granger-Brown also fail to explain how the slider head is moved inwardly in half track increments. A possible source of such position data is a change in magnitude of the signal read by the slider head reading as it moves inwardly. For, example in U.S. Pat. No. 4,912,576 issued Nov. 8, 1983 entitled *Method for Writing Servo*, D. W. Janz, explains that if a flux gap of a slider head sweeps forty percent of a signal pattern previously written to the disk surface, then the read voltage generated by that flux gap should be forty percent of the voltage maximum obtainable from the flux gap when the slider head is aligned dead-center over that signal pattern. In fact, in U.S. Pat. No. 4,912,576, Janz describes a method utilizing the magnitude of the voltage signal from a slider heading reading a track for alternatively writing servo bursts patterns into tracks on one side of a disk for servo and data signal patterns into tracks opposite side of the disk. The apparatus described by Janz has an HDA which includes two slider heads, a data head and a servo head, sharing a common actuator mechanism which read from and write to opposite sides of a spinning disk. After erasure of the disk for initialization, a track of first phase servo burst pattern is written on the servo side of the disk at an outer limit by the servo head. The slider heads are then moved in radially one half of a track, as indicated by the amplitude of the voltage signal produced by the servo head reading the track containing the first phase servo burst pattern, and a first data-track is recorded on the data side of the disk using the data head. The slider heads are again moved-in radially one half of a track, this time as indicated by the amplitude of the voltage signal produced by the data head reading the first data-track, and a second phase servo burst pattern is recorded on the servo side. The process is repeated with slider heads being moved radially inward one half of a track at a time until the respective recording surfaces of the disk are filled with servo and data tracks, i.e., the slider head reach the inner stop. Three different phase servo burst patterns are written into the tracks on the servo side of the disk, one phase servo burst pattern per track with the sequence of phases of servo burst patterns being repeated every three tracks. According to Janz the three different phase servo burst patterns should be angularly (circumferentially) offset relative to each other. Also, during the servo writing process, per Janz, three different phase data signals are written into the data tracks recorded on the data side of the disk. While Janz indicates that his preferred process of writing servo writes the servo tracks to one surface of a disk surface, it is clear that he contemplates embedded servo containing three different phase servo bursts written on the same side of the disk using the same slider head that writes the data signals. [See U.S. Pat. No. 4,912,576, FIG. 8 and col. 9 11. 26–37].

However, Janz fails to describe, teach or suggest any method, means or other mechanism for eliminating, mitigating, or minimizing mis-positioning errors due to such things as spindle wobble, disk slip, bearing runout thermal expansion/contraction and the like when writing or embedding the servo tracks. Accordingly, even an embedded servo burst pattern written only to one side of a disk per the methods described by Janz is not likely to assure that a particular track centerline around either side of the disk is concentric with either of its adjacent tracks or even the spin axes of the disk.

In U.S. Pat. No. 4,414,589 issued Nov. 8, 1983, entitled *Embedded Servo Track Following System and Method for Writing Servo Tracks*, T. H. Oliver et al describe a method for writing embedded servo burst patterns to a disk surface quite similar to those described by Janz and Fowler &

Granger-Brown. While the preferred method contemplates multiple heads and disk surfaces, per Oliver et al, with a single slider head and a single disk surface, a reference track is written around the disk by the head and the head is moved inwardly radially, until the signal read by the head from the just written reference track equals an arbitrary percentage less than the track center line signal. At that point, a first type (even) of servo burst pattern is written into sector header regions and a second reference track is written into sector data regions.(Sector information is derived from a previously written indexing track) In a similar fashion, the slider head is again moved in until the signal read by the head from the just written second reference track is an arbitrary percentage less at which point a third reference track is written this time only into the data regions of each sector whereupon the head is again moved in with the head reading the third reference track for writing a second type (odd) of servo burst pattern into sector header regions and a fourth reference track into sector data regions. Using techniques similar to those described in Janz and Fowler & Granger-Brown, the slider head is radially stepped in half track intervals across the recording region of the disk alternatively writing even and odd servo burst patterns to the sector headers for every two reference tracks written. The point of departure of Oliver et al relates to use of a summing node means which produces a zero or null signal when the slider head positioned relative to and reading a portion of reference track, produces a signal a desired percentage less than the center track signal.

Oliver et al, like Janz and Fowler & Granger-Brown did not appreciate the necessity for assuring that a particular track centerline around either side of the disk is concentric with either of its adjacent tracks or with the spin axes of the disk. For example, spurious (noise) signals in the circuitry for the slider head are not compensated for or prevented from reaching the summing node means. Accordingly, writing of odd/even & even/odd pairs of servo burst patterns that are neither concentric nor radially offset one track width with respect to each other are not precluded.

Also, as recognized by Oliver et al, the reading and writing performance of slider heads of HDAs are not uniform radially and that head performance is best at the outer periphery of the data region of the disk and deteriorates as head moves radially inward. However, Oliver et al, do not identify possible operative factors which degrade head performance near the inner peripheral of the data region of the disk. Operative factors which degrade the perceived performance of slider heads of HDAs as they move radially inward include a shorter circumferential track length for the same angular or clock (index) interval, i.e., higher data signal densities on disk, and a decrease in surface velocity of the disk surface and a corresponding decrease in flying height and air bearing stability as a function of radial position.

In addition, for higher data storage densities slider heads must fly at elevations 1 to 2 μinches above the spinning disk surface, i.e., at substantially lower elevations than thought possible a decade ago. In effect, from the perspective of the slider head, it actually skims or polishes the peaks of the disk surface material sweeping below it. At such flying elevations, problems associated with friction and temperature are more sever in the interior data region of the disk surface than at the exterior Also, convection cooling is less in the interior of the disk. And, contrary to the observations of Oliver et al, beck,use of lower flying elevations, the disk tracks written in the interior regions of the disk are typically narrower than those written in its outer periphery. Accordingly, the magnitude of obtainable signal from a signal recorded to the interior of a disk is generally less than that obtainable from a signal recorded in peripheral regions of the disk, i.e. the signal-to-noise ratio decreases with radius.

However, it should be noted that it was non uniform radial performance characteristics of the slider heads that stimulated the innovation proposed by Oliver et al a decade ago, of letting the performance characteristics of the slider heads of a particular HDA determine the location and therefore pitch of tracks on its disk surfaces by using those heads to write the embedded servo burst patterns to each disk surface. For current and contemplated high storage capacity magnetic memory disks, techniques implementing the proposal of Oliver et al are a practical necessity.

Mis-positioning errors due to spurious electrical noise, spindle wobble, disk slip, disk tilt, bearing runout, thermal expansion/contraction, external vibration and the like, when writing embedded servo burst patterns using the slider head(s) of the HDA are further compounded by the fact that track width varies as it is being written by a slider head. There are a myriad of factors which affect track width, among them signal strength, flying height, the relative permeability of the magnetically susceptible coating on or of the disk surface, the relative elevations of the surface, gravity, magnetic bias forces, Coriolis forces, head cable forces and windage. Such factors are often interrelated and in many instances derive from the same sources that give rise to other mis-position error.

For example, when writing signals onto a spinning disk surface, where the reluctance of the magnetic circuit across the flux gap between the pole faces of a slider head is greater than the reluctance of the magnetic circuit through the magnetically susceptible material of the spinning disk surface between the pole faces, track width will increase with increasing flying height above the spinning surface, i.e., the track fringes out with increasing flying height until the reluctance of the magnetic circuit through the magnetically susceptible surface of the spinning disk is comparable to that presented by the flux gap at which point the track width will begin to narrow with increasing flying height. Conversely, making the same assumptions, track width narrows with decreasing flying height to equal that of the flux gap when the flux gap, figuratively speaking, is flying through or on the magnetically susceptible material of the disk.

In contrast, when the head is reading or sensing magnetic signals recorded/written in the disk surface, the magnitude of the generated signal is always inversely related to reluctance of the magnetic circuit which increases with increasing flying height. In short, the presumption of prior practitioners, that the magnitude of signal generated in the slider head sweeping over a pattern of magnetic signals written/recorded in a track is linearly or directly related to the proportion of the track sweeping beneath the flux gap of the head is not necessarily correct unless one assumes the head is flying at approximately the same height as it was when it wrote that signal to the disk surface. This later assumption cannot be made.

In particular, every spinning disk has eccentricity meaning that it is typically not mounted exactly coaxial with the spin axis of the HDA. [In fact, a single dynamic spin axis for an HDA can not even be assumed.] This means that the relative surface velocity of a stationary head flying above such an eccentricity spinning disk at any particular radial (or track) position cyclically varies increasing and decreasing flying height, correspondingly increasing (or decreasing) and decreasing (or increasing) the width of a track being written. And, because bearing mechanisms mechanically constraining the spinning disk have runout, it cannot be assumed that any point on the eccentricity spinning disk will follow the exactly the same path or orbit each disk revolution. But, rather, analogous to a point in a vibrating string which describes an elliptical orbit that precesses around the quiescent string position, a point on a slightly eccentricity spinning disk surface should be assumed move in a corresponding precessing elliptical path or orbit.

Other common sources of cyclically induced variation in head flying height include disk tilt, and disk slip. Variations in surface elevation of the disk in different regions can also induce cyclically variation in head flying height that may be the same for a group of adjacent tracks but which may differ between non-adjacent groups of adjacent tracks. [Variations in surface elevation of the disk can stem from standing and moving wave (drumhead) vibrations, surface finishes, variations in coating thickness and the like.] Complicating such cyclic variations in flying height and corresponding variation in track width is *Le Chateliers Principle* and *The Principle of Least Energy*.

*Le Chateliers Principle* provides that whenever a stress is applied to a system in equilibrium, that equilibrium is displaced so as to reduce the affect of that stress. *The Principle of Least Energy* provides that when a system is in stable equilibrium, any slight change in its condition or configuration requiring performance of work will put it out of equilibrium, so that, if the system is left to its self, it will return to its former state and in so doing will give up the energy imparted when it was disturbed. *Lenz's Law*, a particular case of *Le Chateliers Principle*, provides that in case of a change in a magnetic system, that thing happens which tends to oppose that change. [*Lenz's Law* is the phenomenon utilized to transduce or convert the respective electrical and magnetic signals into each other.] However, in addition to transducing the signals, in simple terms, application of *Le Chateliers Principle* and the *Least Energy Principle* to flying heads and spinning disks means that any increases or decreases in magnitude of the electrical and magnetic signals being written to or read from disk necessarily induce corresponding increases or decreases in flying height of the head (and a variation in track width). Also, such increases and decreases induce eddy current forces which tend to decelerate and accelerate the spinning disk.

Because of the inter-relation of the multitude of factors affecting track width and radial position, it can be said that the boundaries or edges of a track being written to disk by a slider head undulate responsive to some factors while the track centerline meanders responsive to those and other factors. The undulations in the boundaries or edges of a track are not necessarily symmetrical relative to track centerline because of variations in forces [torques] tending to twist the flux gap of and the slider head relative to the plane of the disk surface. Both edge undulations and centerline meanders may include cyclic components. Accordingly, when reading an undulating, meandering track, the servo-responsive positioning mechanisms reading servo bursts moves the slider head to follow the meanderings of a track. However, where servo bursts and a reference pattern are written based upon a desired percentage of a signal (50%) obtained by moving the head incrementally radially out of registry with a previously written adjacent track while reading that track, the undulations and meanderings, both cyclic and not, from the adjacent track are repeated and amended by factors inducing undulations and meanders in the track being written. This process, in essence, converts an undulation in a boundary or edge of an existing signal track sweeping beneath the flux gap of the slider head into a meander, i.e. a displacement in the centerline of the track being written. Such error is further repeated and compounded when the slider head is moved incrementally and positioned radially relative to the just written track based upon signal read for the purpose of writing the next track. Such error continues to grow and evolve until the undulating boundaries overlap and track centerlines meander across one another.

Embedded servo burst patterns defining meandering tracks having overlapping boundaries or having crossing centerlines are not acceptable. Accordingly, bootstrapping servo writing procedures described in the prior art using the actuators servo controllers and slider heads of HDAs have heretofore not been deemed an acceptable method for writing embedded servo.

Classical Adaptive Feedforward Cancellation and Repetitive Control (AFC/RC) techniques such as those described by Sidman (supra) have been suggested for positioning magnetic read write heads in disk drive systems for correcting or compensating for poorly written servo tracks. AFC/RC techniques can also correct for periodic runout and other anomalies in such disk drives. [See paper by M.Tomizuka, Tsu-Chin Tsao & Kok-Kai Chow entitled *"Discrete-Time Domain Analyses and Synthesis of Repetitive Controllers"* (1987) & paper by Kok-Kai Chow & M.Tomizuka entitled *"Digital Control of Repetitive Error in Disk Drive Systems"* (1988). Such corrections are required because, in most cases, the conventionally written servo tracks or embedded servo samples have both inherent errors and systemic error. [Systemic error refers to the position error in writing servo samples arising from mis-correlation of exterior "absolute" standards to the inherent internal coordinate system of the HDA.] In fact holding a writing slider head "absolutely" stationary while writing servo bursts to a spinning disk of an HDA when small, low frequency, periodic and repeatable forces are acting on the HDA results in a final drive that will always require AFC/RC in order to function optimally.

Applying classical AFC/RC techniques to servo on a previous track per the teachings of Oliver et al, and Janz (supra) while writing the next can alleviate, to a degree, the tendency for the track center lines to meander or become more and more "out of round" and distorted as a servo pattern is written over many iterations or disk revolutions. However, classical AFC/RC techniques, have drawbacks.

In particular, to function well above the Nyquist limit for frequencies inherently existing in disk drive systems, high sample rates are required. High data processing rates, filtering, fast fourier transform (FFT) operators, and estimaters are also necessary. Meeting these requirements demands large memory and very high speed data signal processors. In addition, non-sinusoidal repetitive errors are impossible to predictably model from drive to drive, and once modeled, difficult to compensate for. However, the biggest drawback is that for classical AFC/RC techniques to work effectively, the drive platform must be extremely well modeled. Even very small variances between the predictive model and the actual HDA platform can introduce errors or, worse yet, compound them by reinforcing rather than canceling non-positional information content in the generated position error signals (PES). The result is embedded servo burst patterns defining meandering tracks having overlapping boundaries and/or crossing centerlines.

SUMMARY OF THE INVENTION

An invented bootstrap method implemented by a computer and/or microcode in an integrated circuit for establishing parallel or concentric signal tracks on a spinning disk surface of a disk drive data magnetic storage device using the magnetic transducer slider head of the drive positioned radially relative to the spinning surface by the drive's servo-responsive, precision actuator and servo controller includes the steps of: writing a magnetic signal track with undulating boundaries and a meandering center line relative to the axes of the spinning surface for one revolution of the surface; reading the just written magnetic signal track; creating, in memory, a digitized position signal table; storing in a row of the table an initial digital position signal representing the amplitude of the signals read from a plurality of sampling points around the just written track decreased by a specified percentage; servo positioning the slider head radially for reading magnetic signal at an edge of the just written track using the initial digital position signal stored in the memory table; reading a position signal for each sampling point; generating digitized position signals representing the amplitude of the, just read position signals read by the slider head reading the edge of the just written track for each of the plurality of sampling points for each surface revolution; generating a target digital position ;signal for each sampling point by averaging the just digitized position signals for each sampling point with previously digitized position signals for that particular sampling point stored in the memory table; comparing the just digitizing position signals to the corresponding target digital position signals for each sampling point and using that comparison to produce a comparison signal input to the servo controller for generating an input servo signal to the servo-responsive actuator for maintaining the transducer at a radial position with respect to the spinning surface while writing a second magnetic signal track and then repeating the procedure with the just written second magnetic signal track to write a third track and so on to the nth magnetic signal track, the second third . . . & nth track being parallel and concentric.

A particular feature of the invented method is that the memory table storing the digital position signals for the plurality of sampling points is dynamically updated with new digital position signals for each of the sampling points during and for each revolution of the surface for generating updated target digital position signals. Further the memory table can be kept relatively small by the simple expedient of adding the digital signals for each sampling point and then dividing that total by the total number of disk revolutions providing that total to derive updated target digital position signals. Alternatively, the digital position signals for each sampling point for each disk revolution can be stored as a row in a memory array where the updated target digital position signals are derived by summing each column of the array and dividing that total by the number of rows in the array. While an array is more memory expensive, it has added advantages of allowing winnowing of the rows and columns before deriving target digital position signals with a selection criteria.

A novel aspect of the invented method is a discovery that the comparison of the dynamically updated target digital positions from the memory table with the just read digital position signals converge to produce an excursion limited or constant input servo signal to the servo-responsive actuator which can then be adjusted to compensate for constant forces inducing the slider head to drift radially.

Another novel aspect the invented method is the discovery that radial drift of the slider head relative to the spinning surface can be precisely determined by allowing the slider head to coast by reducing the magnitude of the variation in the servo command signal to the servo-responsive actuator to zero for at least one disk revolution and comparing digital coast position signals from one or more of the sampling points generated by the transducer reading the edge of the just previously written track with previously and/or subsequently obtained digital position signals from corresponding sampling point: when the servo-position actuator is driven or tracking per servo command signals obtained by comparing target digital position signals derived from the memory table and the just read digital position signal.

Still another aspect of the invented method is the discovery that optimal target digital position signals can be obtained after compensating for drift, by successively clamping, in steps over a disk surface revolution or less, the amplitude of variation in the servo command signal to the servo-responsive actuator decreasing the amplitude of that variation to zero, while comparing just digitized position signals for each sampling point to and updating the target digital position signals for those points, for positioning slider head radially at a coast position for reading an edge of a just previously written track, generating coast position signals for each of the sampling points for a plurality of disk revolutions, digitizing those coast position signals and inputting the digitized coast position signals to second memory table either for updating/optimizing target digital position signals in the initial memory table, or for providing an independent source for deriving target digital position signals for radially positioning the slider head when writing the next track of magnetic signal to the disk surface.

A primary aspect of the invented method for establishing concentric magnetic signal tracks on a spinning disk surface of a magnetically susceptible material is that the slider head can be positioned radially relative to the spinning surface by a servo-responsive precision actuator for ultimately writing a fiducial track to the spinning surface concentric with its spin axes which can then be used for determining radial position of subsequent tracks.

Briefly, the invented method for writing adjacent concentric magnetic signal tracks to a spinning disk surface can be implemented with a digital signal central processing unit (CPU) such as a computer or other programmable integrated circuit (IC), using the mechanical and signal processing components generally available in conventional magnetic memory disk storage systems (disk drive) and random access (RAM) associated with either with the disk drive or CPU. The disk drive components being controlled by and providing input to the CPU include a spinning disk having a surface composed of a magnetically susceptible material for storing magnetic signals, a spindle motor spinning the disk at variable velocities, a read/write transducer slider head (slider head) writing and reading magnetic signals from the spinning disk surface, an actuator for radially positioning the transducer radially over the spinning surface between inner and outer physical radius stop limits, a variable gain read amplifier connected for receiving electrical signals to and from the transducer, a write amplifier/buffer for inputting electrical signals from the CPU to the slider head to be written to the disk surface, an analog-to-digital converter (ADC) connected for receiving electric signals from the variable gain amplifier; a timing engine (TE) coupled with the spindle motor which should include a variable clock oscillator (VCO) for providing timing electrical signals to the writ, amplifier buffer and the CPU and a servo controller for producing a resultant servo command signal to the actuator for moving the radial position of slider head. The RAM associated either with the disk drive or CPU is connected for receiving and storing digital signal outputs from the A/D converter and, via the CPU for producing output target position digital signals to the servo controller.

Using the components described above, the invented method enables a novel checkerboard technique for writing embedded servo burst patterns defining concentric data signal tracks onto a spinning surface, capable of storing readable and erasable magnetic signal patterns using a slider head transducer capable of writing, reading and erasing such signal patterns to the spinning surface positioned radially relative to the spinning surface by a precision servo-responsive actuator controlled by, for example, a Proportional, Integral and Differential (PID) servo controller which preferentially includes steps of:

1. Writing a non-ideal initial magnetic signal track to provide a reference edge stable enough to read and servo upon with the slider head;
2. Generating an initial table of initial digital position signals in memory indicating amplitude of signals multiplied by a track pitch ratio factor (typically 0.5±0.25) either read at a plurality of sampling points for one disk revolution or estimated to represent the full on track signal amplitude;
3. Servo positioning to the reference edge of the just written track with the servo controller for a plurality of disk revolutions initially using the initial table of digital signals averaged with and compared to signal read by the slider head from the just written track at corresponding sampling points for the first revolution and thereafter using a digital signal compiled from an average of a plurality signal amplitudes read for each sampling point compared to the signal read by the slider head from the just written track for that sample point;
4. Establishing an integral value of current command signal to the actuator, while servoing, where the sum of proportional and differential current command signals produced by the servo controller over one disk revolution are equal to zero;
5. Reducing (clamping) progressively proportional and differential command signals to the servo controller toward zero;
6. Allowing the actuator to "coast", with only integral control current command signal, for a period of time (typically one revolution or less); and
7. Generating a second table of digital signals in memory representing the amplitudes read during the "coast" period, and repeating steps 4 and 5 as needed to provide signal averaging, statistical cancellation of random noise and reinforcement of repeating signal content. [At this stage, of the invented method the second table defines an edge of the track with all repeatable forces acting on the actuator and slider head. IN ESSENCE, THE SECOND TABLE BASICALLY MODELS THE HDA PLATFORM AT THAT TRACK EDGE.]
8. Enabling full PID servo using the second table vs. the read amplitudes [Any position error signal command to the actuator now essentially represents a response to random noise or forces on the system.]; and
9. Erasing alternate track segments with a DC erase or other magnetic signal input from CPU to the slider head for up to a full disk revolution while servoing on the reference edge of the initial track with full PID servo using the second table vs. the read amplitudes allowing the HDA to quiet to a least energy state with full PID servo position control while writing magnetic signal to the spinning disk surface; and in the next disk revolution,
10. Writing a first magnetic signal servo burst pattern track with a reference edge exterior the reference edge of the initial track on the immediately following disk revolution while servoing on the reference edge of the initial track with full PID servo using the second table vs. the read amplitudes; and
11. Inhibiting writing if the Position Error Signal to the servo controller exceeds an specified limit due to shock or noise and rewrite the track or individual samples points within the track as needed.
12. Checking the newly written track for integrity and updating the initial table created at Step while still servoing on the reference edge of the initial track with full PID servo using the second table vs. the read amplitudes; then
13. Repeating steps 2 through 12.

Steps 2 through 13 are then successively repeated as many times as necessary to fill the spinning disk surface with a cleckerboard of servo burst pattern where a concentric data track center lines are defined for each to iterations of steps 2 through 11 after the first servo burst signal track is written.

The invented bootstrap method of writing concentric tracks to disk is compatible with all techniques for implementing servo positioning of the slider head over the spinning disk surface including but not limited to Proportional, Integral and Differential (PID); Infinite Impulse Response (IIR), Finite Impulse Response (FIR) and AFC/RC servo controllers.

The principal advantage for employing the invented bootstrap method for writing concentric tracks to a spinning surface of a magnetic disk drive data storage system is that track densities ranging in excess of 10,000 tracks per inch can be achieved, i.e., track pitches less than 100 μin.

It should also be appreciated, that with the invented bootstrap method for writing parallel and concentric magnetic signal track, track separations with resolution down to 5 μin. are reliably achieved and an improvements in resolutions down to 1 μin. are thought to be achievable with narrower slider head read/write gaps.

In fact, the discovered principles underlying the invented bootstrap method are not limited to magnetic data storage disk drive systems, but rather are generally applicable to any dynamically moving and periodically varying platform which will digitally define itself in RAM memory, using input from a field gradient sensor/generator comprising an integral interacting part of the platform. Further, that memory model and the particular sensor/generator can then be used to generate fields in space and time from which position can thereafter be determined by that particular sensor/generator in the dynamically moving and periodically varying platform with a degree of resolution heretofore not generally believed to be possible because of limitations of the *Uncertainty Principle.*

Still other features, aspects, advantages and objects presented and accomplished by the invented bootstrap method implemented by a computer and/or microcode in an integrated circuit for establishing concentric signal tracks on a spinning disk surface of a magnetically susceptible material will become apparent and/or be more fully understood with reference to the following detail explanation in context of drawings showing exemplary embodiments of the mechanical, electronic, and computational components of the respective systems thought necessary for reliably writing fiducial or embedded servo magnetic signal tracks/bursts to the spinning disk surface.

DETAILED DESCRIPTION OF PREFERRED EMBODIMENTS

Figure 1:
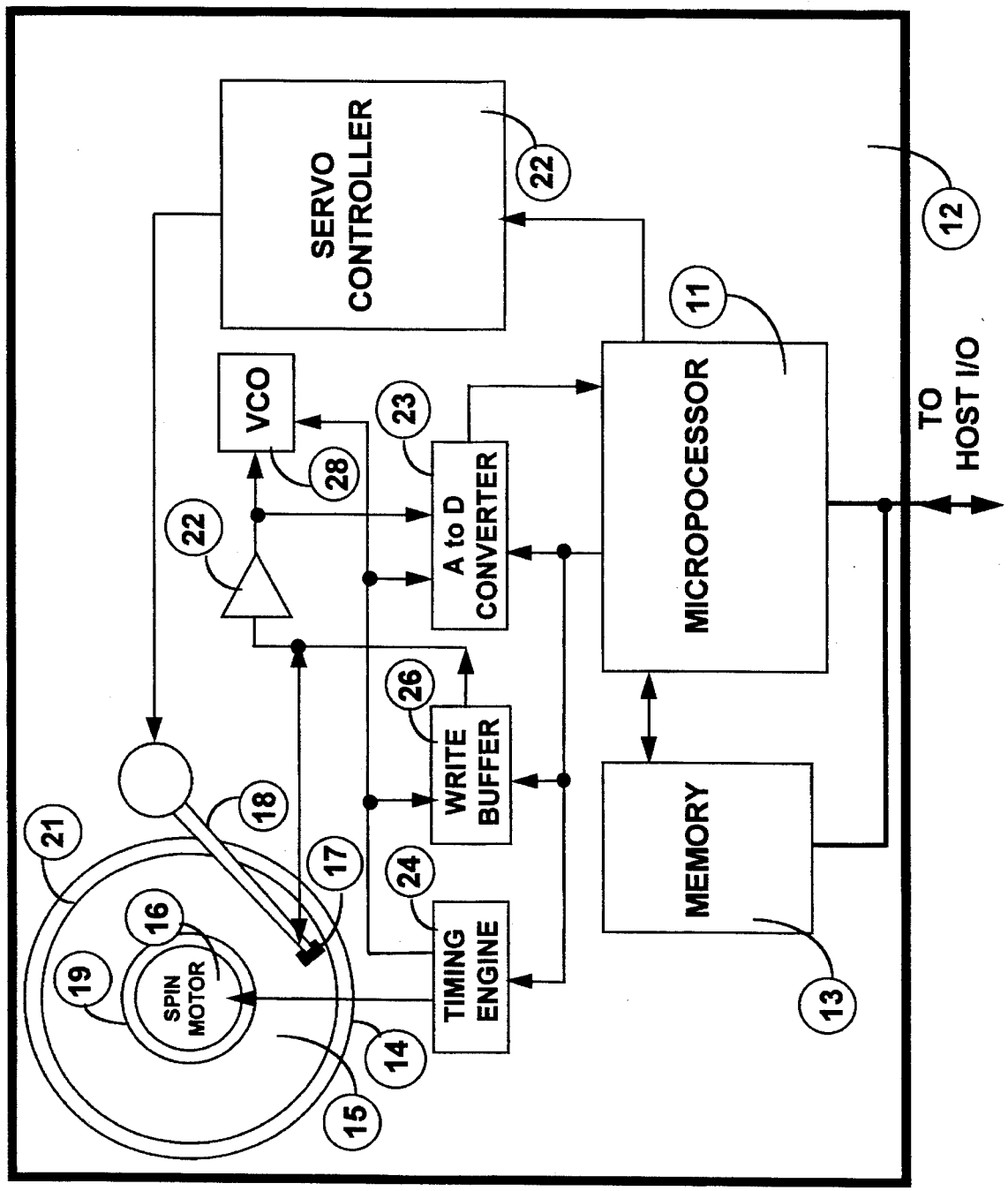
FIG. 1 is a block diagram illustrating the interaction and relationship of the basic components necessary in a computer and magnetic data storage disk drive system for implementing the invented bootstrap method for writing concentric signal tracks onto the spinning magnetic signal storage surface of the drive.

Looking at FIG. 1 the invented method for establishing concentric adjacent tracks on a spinning disk of a magnetic disk data storage system requires a digital signal central processing unit or CPU 11 such as a computer or other programmable integrated microprocessor circuit, components in a conventional magnetic memory disk storage systems (disk drive) 12 and random access memory (RAM) 13 associated either with the disk drive 12 or CPU of the essential mechanical elements of the disk drive system 12 necessary for implementing the invented method include: a rotatable disk 14 presenting a spinning disk surface 15 composed of a magnetically susceptible material for storing and providing magnetic signals; a spindle motor 16 for rotating the disk 14 at variable velocities responsive to CPU 11 input; a read/write transducer slider head (slider head) 17 for reading and writing magnetic signals to and from the spinning disk surface 15; a voice coil actuator 18 for positioning the slider head 17 at different radial positions over the spinning surface 14 between an inner physical radius stop limit 19 and an outer physical radius stop limit 21.

Electronic signal and data processing components of the disk drive system 12 necessary for implementing the invented method include: a variable gain read amplifier (VGA) 22 connected for receiving electrical signals generated by the magnetic gap (not shown) of the slider head 17 sensing magnetic signals written to the spinning disk surface 15; an analog-to-digital converter (A/DC) 23 connected for receiving electrical signals from the variable gain amplifier 22; a timing engine 24 operatively coupling between the spindle motor and the CPU 11 for providing digital timing or angular ($\Phi$) signals indicative of rotational position of the disk 14; a write buffer/amplifier 26 for inputting electrical signals from the CPU 11 and timing engine 24 to the slider head 17; a variable clock oscillator (VCO) 28 lockable onto clock signal whether independently provided by the timing engine 24, spindle motor 16 or generated by the slider head 17 reading magnetic signals from the spinning disk surface 14 for providing an output reference frequency, and a servo controller 29 receiving (digital) position comparison/demand signal derived from RAM 13 and digitized signals from the slider head 17 reading magnetic signals from the spinning disk surface 15 by the CPU 11, producing a resultant control/command signal to the actuator 18 for changing the radial position of the slider head it 7 over the spinning disk surface 15. The RAM 13 associated with either with the CPU 11 or disk drive 12 is connected for receiving and storing digital signal outputs from the A/D converter 22, and, via the CPU 11, for providing output target (digital) position signals to the servo controller 29.

Figure 2:
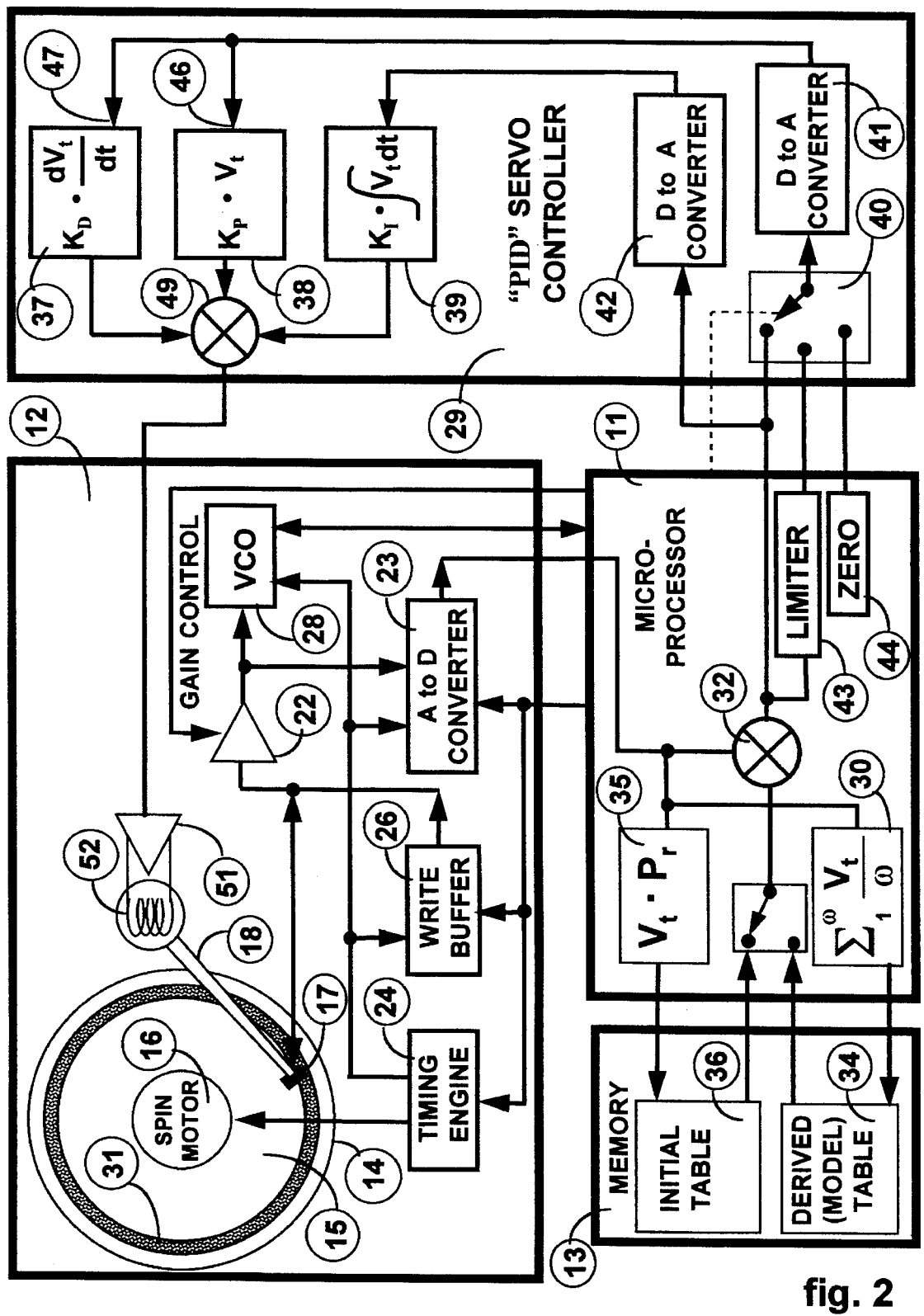
FIG. 2 is a block diagram schematically illustrating a typical scheme for implementing the invented method utilizing a PID servo-controller for energizing the actuator for positioning a read write slider head over the spinning disk surface of a magnetic data storage disk drive system.

Looking now to FIG. 2, an exemplary servo positioning loop of the invented method for servoing the slider head 17 to an edge of a magnetic signal track 31 includes the CPU functional block 11 the disk drive functional block 12, the memory functional block 13 and the servo controller functional block 29. It should be appreciated the functional components described within and each functional block 11, 12 & 29 are exemplary, and that many of the described electronic, memory and computational components may either reside in the CPU 11 or the disk drive 12. As shown drive 12 includes a read Variable Gain Amplifier VGA 22, receiving signal sensed by the slider head 17 and outputting signal to the A/D converter 23 which outputs digital position signals ($v_t$) indicative of amplitude of the voltage signals from the VGA at any particular time. The digital position signals ($v_t$) from the A/D converter 23 are input into a conventional digital summing processor (DSP) 32 and into a memory table 34 in RAM 13. As indicated, by box 30, the memory table entry at any point in time is the sum of the digital position signals ($v_t$) divided by the number disk revolutions $\omega$ over a time interval. More than one such memory table should be reserved in RAM 13 including an initial input table 36 for storing a maximum pitch ratio ($P_r$) digital position signal [($P_r$)*($v_t$)]as indicated by box 35. A target digital position signal is derived from the memory table 34 for each of n sampling points in a revolution of the disk where n is a suitably large integer determined with reference to 'Nyquist criteria'. Referencing the timing engine 24, the CPU 11 inputs a target digital position signal to the DSP 32 corresponding to the sampling point of the actual digital position signal coming from the slider head 17. The DSP 32 outputs a comparison/demand digital signal indicative of the difference between the target digital position signal and the actual digital position signal to the servo controller 29, in the illustrated case, a conventional PID servo controller.

The PID servo controller 29 includes three channels, a differential controller 37, a proportional controller 38 and an integral controller 39. As illustrated, the differential and proportional channels 37 & 38 may share a common digital-to-analog D/A converter 41. A separate digital-to-analog D/A converter 42 is provided for the integral channel 48. The differential and proportional channels 37 & 38 are also controlled by a common switch 40 which responsive to the CPU 11 allows the D/A converter 41 to alternatively receive input comparison/demand signal from the CPU 11 directly, or input comparison/demand signal from the CPU 11 via a clamping circuit, or input comparison/demand signal from the CPU 11 from a 'zero' circuit 44 input. Signal to the integral controller 48 is not interrupted. The output signals from the differential, proportional and integral controllers 37–39 are summed by a conventional analog summing circuit 49 which in turn is input into a current amplifier 51 to produce a current signal for energizing the voice coil 52 of the actuator 18 for changing the radial position of the slider head slider head 17 over the spinning disk surface 15. Alternatively, the entire PID servo control function could be implemented digitally with the resulting combined signal input, via a D/A converter, to the current amplifier 51.

It should be appreciated by those skilled in the servo positioning arts that components described above for implementing bootstrap method for writing concentric magnetic signal track to a surface of a spinning disk of a magnetic data storage device are exemplary. There are many different possible arrangements of digital signal processing and computing components that can be utilized to implement the invented method. Moreover, the invented bootstrap method can be equally well implemented using Infinite Impulse Response (IIR), Finite Impulse Response (FIR) or any other servo position controller technique which, under ideal circumstances, only functions to maintain position against outside and non-repeating forces.

Before initiating the invented method for writing concentric adjacent magnetic signal tracks, all readable data and/or servo magnetic signal previously stored or written to the spinning surface 14 of the disk 12 should be completely erased. There are a number of conventional and well known methods for assuring complete erasure of such previously written and stored data and servo magnetic signals, among them being the simple expedient of 'wiping the surface' with an external magnetic field, i.e., passing the disk surface 15 through an external magnetic field of sufficient field intensity for saturating and commonly orienting magnetic domains of the magnetically susceptible material of the surface 14 of disk 12. [Also reference may be made to applicant's co-pending application, Ser. No. 08/274,676 filed Jul. 12, 1994 in the United States of America entitled, SELF-SERVOWRITING DISK DRIVE AND METHOD which describes a technique for assuring complete erasure of data and servo magnetic signals stored by the disk surface using the slider head transducer 17.

After magnetically wiping or erasing the recording surface 15 of the disk 14, using the CPU 11, the slider head 17 is positioned and held, by biasing actuator 18 against the outer radius stop 36. Controlling the spindle motor 16 angular velocity using CPU 11 referencing input from the timing engine 24, a continuous index signal track having clock intervals derived from the timing engine 24 is written by head 17 to the spinning disk surface 15. A Monte Carlo or other technique is utilized to assure physical track closure meaning that after one complete revolution of the surface 14, the end of the signal track is not radially offset from its beginning by more than the capture range of the servo system of the drive. [Conventionally, closure refers to a timing condition in which one complete revolution of a track has a known number of equidistant clock transitions with a last transition having substantially the same spacing as a first transition (at least within ten percent). Thus, when reading such track, a constant frequency signal will be produced assuming constant spindle velocity with a known number of clock transitions per revolution. (See Applicant's copending application, Ser. No. 08/274,676 (supra))]

However, by controlling spindle motor 16 (spindle velocity) with reference to the timing engine 24, an integer number of timing transitions per disk revolution can be arbitrarily designated. At this point, one or more fiducial markers may also be created in the index track. A suitable fiducial marker would comprise a gap or timing intervals created by omitting (erasing) at least three clock transitions. Other suitable fiducial markers include single or dual flux reversals in an erase magnetic signal field, or frequency/phase changes in a constant magnetic signal field. Then following a procedure suggested by Fowler & Granger-Brown in *IBM Technical Disclosure Bulletin* (supra) using the CPU 11, the just written index track can be designated and divided into a plurality of symmetrically oriented sectors and segments each of equal index/clock/angular length for receiving alternate A-type and B-type or C-type and D-type magnetic signal. If the index track includes fiducial markers, at least one fiducial marker should be located in each segment. Fiducial markers should have an angular (time) length sufficient to allow read and write channels connected to the slider head 17 to recover from a read or write operation respectively enabling it to write into or read from, respectively, a subsequent segment. The angular (time) length of the segments should also be sufficient for the VCO 29 to lock on to. However, the alternate A, B, C & D signal segments should not have angular or clock lengths which would allow either the VCO 29 or spindle velocity (angular velocity) to drift significantly (more than 0.01 percent).

With the slider head 17 still positioned and held, by biasing the actuator 18, at the outer radius stop 21, using the CPU 11 via the write amplifier/buffer, A-type signal bursts can be written into the A-type clock intervals of the index signal track using a conventional phase-lock looping technique referencing either transitions in the B-type clock intervals, the spindle motor 15 and timing engine 24 and/or the fiducial indicators created in the track. Accordingly, the index track just written with the slider head 17 held, by biasing actuator 18 at the outer stop limit now contains clock information which can be replicated or propagated across the annular data recording surface of the spinning disk surface 15 by writing adjacent tracks partially overlapping the just previously written track using the slider head to read the A-type bursts or B-type bursts and/or C-type bursts or D-type bursts written to that track to providing signals for the VCO 29 to lock onto while writing B-type or A-type bursts and/or D-type or C-type bursts into alternate B or A and/or D or C burst intervals respectively of the overlapping track being written. [See Fowler & Granger-Brown, supra.]

However, clock information provided by the timing/angular ($\Phi$) signals produced by the timing engine 24 for each disk revolution is preferred for writing alternative A, B, C or D type magnetic signal bursts into respective segments of a track for maintaining bit-synchronism between tracks. In particular, the necessity of compensating for accumulating phase error due to write/read delay remarked on by Fowler & Granger-Brown, supra, is eliminated. The alternate magnetic signal burst segments can become a source data for comparing and cross checking between clock signal provided by the timing engine 24 and that written to disk at different times and in different annular regions, thus providing a measure of performance of the HDA platform.

It should be appreciated that the physical mechanisms of the outer stop limit 21 will provide unique meander to the index track that is not replicated when the slider head 17, associated load arm and pivoting mechanisms of the actuator translating it radially with respect to the spinning disk surface 14 are not so physically constrained. In essence, biasing actuator with the servo controller to maintain the actuator against the physical radius limit or stop does not comprise a least energy constraint state between the slider head and the spinning disk surface. Accordingly, when freed of the constraints of the stop limit 21, meander attributable to the stop limit will cease, and meander attributable to least energy conditions between the slider head 17 and spinning disk surface 15 commence. Attempting to follow meander of an index track due to a physical stop limit 21 while simultaneously attempting to compensate for variations in slider head position rising from least energy conditions can and frequently does become chaotic. While such chaotic meanders of the initial successively track center lines are ultimately eliminated from subsequently magnetic signal tracks while clock information is preserved as discussed infra, it is usually necessary, to re-write those initial signal tracks. This is accomplished, as is discussed infra, by reading and establishing servo positioning upon a stable reference track edge away from the stop, and then stepping the slider head 17 toward the stop 21 while overwriting new magnetic signal tracks in the annular region adjacent the stop.

In fact, the principal reason for preferring to write the initial index track with the slider head 17 positioned and held, by biasing the actuator 18, at the radius stop limit 21 or alternatively 19, is that physical closure of the track is more easily obtained. To explain, where track widths range between 150–500 μin., a very slight disturbance of the system will prevent a track ending and beginning at exactly the same position on the disk surface in one disk revolution. [Conceivably with a constant drift, the, track could spiral inward (or outward) never crossing itself.]

It was discovered, that either in the absence of, or upon achieving correct compensation for liner drift forces biasing the slider head 17 causing it to move inexorably to either the inner or outer physical limit 19 or 21, a coasting slider 17, per the *Least Energy Principle*, will inherently seek and follow a quiet or least minimum energy path relative to and over the spinning disk surface 15. Energizing the slider head for writing signal to the spinning magnetically susceptible surface 15 will disturb or perturbate the coasting slider head to some degree, however, the coasting, energized writing slider head will similarly inherently find a quiet or least minimum energy path and magnetic signal track relative to the spinning disk surface 15. These respective quiet least minimum energy paths may not be identical, but each will physically close at some point in a disk revolution. The center line of this quiet least minimum energy track will meander relative to the spin axes of the spinning disk surface 15, and its edges will undulate. However, in general, such quiet least minimum energy magnetic signal tracks provide an edge stable enough read and servo upon.

Looking at FIG. 2, a constant digital position signal (v) corresponding to an estimated or desired voltage signal amplitude is input to the constant table 36 created in RAM 13 indicative of the an anticipated voltage amplitude of the VGA 22 signal from the slider head 17 from the just written track 31. Sampling points or intervals symmetrically oriented with respect to the disk spin axes are chosen with reference to timing/angular (Φ) signals produced by the timing engine 24. Assuming physical track closure, after one plus disk revolution, slider head 17 is switched to read signal from the just written track 31. The slider head 17 is maintained in position over the just written track 31 using the initial digital position signal v in the constant table 36 compared with output digitized signals from A/D converter 23 indicative of voltage amplitude of the position signal read by the slider head 17 in each sampling increment. These initially read signals are stored to the derived memory table 34, compared to determine variation and if excessive, the procedure is repeated until either on the just written track 31 from different points of beginning or another written quiet least minimum energy signal track until the variation in read digitized signal amplitudes in the derived memory table 34 is within specified limits, i.e., less than 25% or ¼ the read/write flux gap width of the slider head 17. These initial digital position signals may be averaged with the constant digital position signal and input to RAM updating the constant table 36. The digital values stored in constant memory table 36 are then multiplied by a desired maximum pitch ratio $P_r$ for decreasing voltage amplitude of the analog signal indicated by the digital values in the constant table 36 responsive to the change in value of the initial digital position signals. DSP 32 of CPU 11 then generates a comparison/demand signal to servo controller 29 which in turns input servo command signal to the voice coil 52 for moving the slider head 17 to an edge of the track 31 thereby initiating servo positioning on that edge.

If while servoing on the track edge, track edge drop off is encountered meaning that slider head digital position signal suddenly goes to zero the servo controller 29 will provide command signal to the actuator for moving the slider head in a direction for increasing measured signal from slider head 17, i.e. either inward or outward depending upon whether the outer or inner track edge was chosen for initiating servo. Similarly if head digital position signal suddenly increases, the slider head 17 will be moved in or out to decrease measured signal from the slider head 17. In each instance, position of the 'in' or 'out' should be tagged in memory particularly if it coincides with a sampling point. Such abrupt 'ins' and/or 'outs' should, under least energy conditions identify the respective ends of the underlying quiet or least minimum energy magnetic signal track.

If per chance, initial servo is desired on the inside track edge, but for some reason it sets up on the wrong or outside track edge, then the first servo command signal from the servo controller 29 for moving the slider head to increase measured signal will continue to energize actuator 18 until outer physical stop 21 is encountered. Similarly if servo positioning is desired on the outside track edge upon but the slider head sets up on the inner track edge a servo command seeking increased measured signal will inexorably move the slider head 17 to the inner stop 19. Accordingly, by choosing appropriate time/angular rotation Φ constraints referencing the timing engine 24, CPU 11 will recognize long duration measured signal drop off and convert to servoing on the opposite track edge, providing appropriate signal conversion input to the servo controller 29 for energizing the voice coil 52 of the actuator to move oppositely toward the track edge. [This particular eventuality may be avoided by writing the initial index track with actuator 18 biased against a stop.]

With these preliminary considerations addressed, we are now ready to implement the preferred invented bootstrap method for writing or defining parallel and concentric tracks to the spinning disk surface 15 with the slider head 17, of the disk drive HDA. In particular, the invented bootstrap method can be implemented by an appropriately programmed digital central micro processing unit or microcode in an integrated circuit with an associated RAM memory by the following functional steps:

1. Locate the slider head at a radial position anywhere on the disk (preferably at or near the extreme periphery established by a mechanical stop) on a quiet or least minimum energy path by applying a DC. current to the voice coil actuator to offset fixed bias forces, and after allowing time for the system to quiet at that radial position:
    a) write, a initial non-ideal track for one disk revolution plus with A- type servo burst and timing magnetic signal in a first segment of m alternate segment pairs;
    b) read sample signals from n sampling points or intervals of the just written one revolution plus track with the slider head and adjust gain such that each sample signal read is below saturation limits of the read channel or A/D converter;
    c) generate and store in memory an initial memory table of initial digital position signals each indicative of an amplitude of a signal read from a sampling point multiplied by a specified percentage or "pitch ratio" $P_r$ estimated to approximate a reduction in amplitude of that sampling point signal anticipated if the slider head were moved a selected fraction of track pitch out of registry with the just written track;
    d) confirm that the table of initial digital position signals stored in memory indicate less than 2.5% variation in amplitude; and

[Variation in amplitude of the read sample signals (shown by the digital position signals stored in the initial memory table) is an indication of energy demands required for holding the slider head 17 at a particular radial position relative to the just written magnetic signal track 31. Minimal variation in the amplitude of those signals means that the relationship between the slider head 17 and spinning disk surface 15 approaches a least energy condition, and means that the track has an edge that is usually stable enough to servo upon. In particular, the magnitude of the variation between sampling points should not exceed the track following capacity of servo controller 29 and actuator 18. For example, assuming, a directly proportional relationship between read signal amplitude and the degree of registry between track and slider head, a 25% variation in read sample signal amplitudes would be an indication of track center line displacements of up to ¼ track width.]

e) calculating an on track, track average amplitude (TAA) of the sampling point signals;

2. Initiate servo positioning of the slider head to a reference edge (inside or outside) of the just written track by comparing digitized sample point signals read by the slider indicative of signal amplitude at each particular sample point with the initial target digital position signal corresponding to that sampling point in the initial memory table generating comparison/demand signal from DSP 32 of CPU 11, servo command signal from servo controller 29 and error correction current to the actuator 18;

3. Adjust servo command signal from servo controller 29 such that the average of A.C. components of the error correction current to the actuator 18 is zeroed;

4. Average each digitized sampling point signal with the corresponding digital position signals stored in the initial memory table for that sampling point and update the initial memory table with the value obtained for creating a new target digital position signal for each sample point each revolution of the disk for a plurality of disk revolutions, thereby eliminating random variation and increasing resolution;

5. clamp progressively through one disk revolution the A.C. error correction components of the current energizing the actuator toward zero and allow the slider head to "coast" through a following revolution; and 6. generate and store in memory a second (memory) table of coast digital position signals representing an amplitude of signal read by the slider head for each sampling point during the "coast" revolution;

7. Repeat steps 5 and 6 using the initial memory table starting at different points in a disk revolution, adding the generated coast digital position signal for each sample point to the corresponding entry in the second memory table for a number of disk revolutions for: (i) averaging random and non-repeating variation (noise and bearing runout); (ii) capturing repeating variation; and (iii) distributing and averaging drift induced errors, whereby, the second memory table provides a definition of (models) the edge of the just written track being servoed upon;

[Rather than creating a simple table of coast digital position signals in memory, it may be preferable to generate a memory array wherein each row Of the array comprises generated coast digital position signals from each of the sampling points for each disk revolution, each column of the array corresponding to a sampling point of the just written magnetic signal track. This would permit application of selection criteria to winnow the rows and columns of coast digital position signals before proceeding with the next step of the invented bootstrap method. Alternatively, such selection criteria could be applied upon completion of each disk revolution or portion thereof before the coast digital position signals from the sampling points for that disk revolution or portion thereof are added to the second memory table.]

8. Compute, an average coast digital position for each sampling point by dividing each entry in the second memory table by the number of coast revolutions; [or where an array of digitized coast position signals are created in memory, sum the columns of the memory array and divide by the number of rows;

9. Normalize the resulting average values for the coast digital position signals in the second memory table by adding to or subtracting from each table value a common offset value (generating a DC error correction current to the actuator 18) which provides a derived average amplitude of a position signal indicated by such table of values equal to the on-track, track average amplitude (TAA) calculated in Step 1e multiplied by the pitch ratio $P_r$;

10. Initiate servo positioning of the slider head on the reference edge of the just written track by comparing digitized sample point signals read by the slider indicative of signal amplitude at each particular sample point with a target digital position signal corresponding to that sampling point in the second memory table for generating error correction current to the actuator, and a) check if average magnitude of comparison/demand position signals from DSP 32 for a plurality of sampling points is less than or equal to ($\leq$) a specified limit L; and if greater than such specified limit L, b) set initial memory table equal to second memory table and repeat steps 5 through 9 reestablishing second memory table until average magnitude of comparison/demand position signals from DSP 32 is less than or equal to ($\leq$) the specified limit L;

[The specified limit L, for the average magnitude of the comparison/demand position signals generated by DSP 32 is determined with reference to the gap width of the slider head 17, the track pitch ratio $P_r$, and comprises a measure of allowable variation in A.C. components of the error correction current input to the actuator 18 for determining if a relationship between the reading slider head 17 and the spinning disk surface 15 approaches a least minimum energy state when constant biasing forces acting on the slider head 17 are compensated by DC error correction current signal input. Ideally, at such a least minimum energy state, there would be no variation in magnitude of the comparison/demand signal output.]

11. Check erasure of the remaining segments of the m alternate segment pairs (the second segment of m alternate segment pairs) by reading with the slider head determining presence and absence of magnetic signal in the remaining segments of the m alternative segment pairs and note in memory presence of signal in particular segments;

[If multiple segments of unerased magnetic signal are encountered, the entire disk surface may have to be re-erased. However, it may be possible, with reference to timing/angular ($\Phi$) signal provided by the timing engine 24 to recover or bridge the involved segment pairs with the coast technique described at step 5 using the CPU to write to or DC erase one or the other of the involved alternative segment pairs. Isolated unerased segments can simply be avoided for servo and timing purposes in the subsequent steps.]

12. Continue, servo positioning slider head 17 as in step 10, and:

a) Write DC erase or other magnetic signal in the remaining segments of the m alternate segments for one disk revolution allowing time for spindle motor recovery upon switching slider head from read status to write status; and during the immediately following disk revolution, b) Write a next track of B-type servo burst and timing magnetic signal pattern into the remaining segments of the m alternative segment pairs for one disk revolution, providing a new reference edge extending exterior the reference edge of the previously written track;

c) Read with the slider head full on-track amplitude sample signal from n sampling points of the track just written while still servoing on the reference edge of the previously written (initial) track;

d) Replace the entries in the initial memory table with new digital position signals each indicative of a current full on-track amplitude signal read from one of the n sampling points and multiply each new table entry by the pitch ratio $P_r$ to obtain a new initial digital position signal for each sampling point;

e) Calculate a new on-track, track average signal amplitude, (TAA); and

13. Initiate servo positioning of the slider head to the reference edge of the just written track by comparing digitized sample point signals read by the slider head indicative of signal amplitude at each particular sample point with the new initial target digital position signal corresponding to that sampling point in the initial memory table for generating error correction current to the actuator; and 14. Repeat steps 3 through 14.

Steps 3 through 14 are then successively repeated, writing in succession, four distinguishable servo burst patterns, e.g., A-type servo, then B-type servo, then C-type servo, then D-type servo burst magnetic signal tracks, successively as many times as necessary to fill the annular region of the spinning disk surface between the initial track and the physical stop with a checkerboard pattern of magnetic servo burst signal pattern where parallel and concentric data track center lines are defined for each two iterations of steps 3 through 17 after writing the first track of B-type servo burst and timing magnetic signal pattern into the remaining segments of the m alternative segment pairs at step 12(b).

If the initial track is written on a least minimum energy path somewhere between the inner and outer physical stops, after filling the first annular region with a checkerboard of magnetic servo burst signal pattern, the slider head is moved to read and servo upon the other edge of the second track written (the side opposite its initial reference edge). Since the second track comprises B-type servo burst and timing; magnetic signal, A-type servo burst and timing magnetic signal are written into the alternate segments in the initial iteration of the invented bootstrap method (steps 1b through 14 supra). The initial track is completely overwritten at step 12 of this first iteration. Servo is then initiated upon the new track reference edge stepping toward the opposite physical stop and a checkerboard of magnetic servo burst signal pattern is written to the second annular region of the spinning disk surface between the initial track and the remaining physical stop.

It should be noted, that four distinguishable (different) types of servo burst magnetic and timing magnetic signal patterns are preferred for the invented bootstrap method. The four different patterns can be accomplished with at least two types of servo burst magnetic signals and at least one type of timing magnetic signal by altering the order of the servo burst signal and timing magnetic signals. Additional distinguishable types of servo burst magnetic and timing magnetic signal patterns in excess of four would enhance the versatility of the invented method and would provide better data for implementing a design for data storage with reference to the resulting checkerboard servo pattern written to the disk surface. However, the Applicants have found that four different or distinguishable types of servo burst magnetic signal patterns (A-type, B-type, C-type and D-type) are suitable for most purposes. Care should taken to insure that the same type of servo burst pattern track is not repeated in the succession sequence until after two different types of servo burst magnetic signal patterns tracks have been written, interleaving in the alternate of the segment pairs.

It also should be noted, that with the invented bootstrap method of writing embedded servo, the data storage system or pattern contemplated for the particular magnetic data storage disk drive system, e.g. Grey code or other track identifiers, are preferably written to disk after the checkerboard servo pattern is written and with reference to the checkerboard pattern using traditional A–B differential and other servo positioning techniques. In fact, such checkerboard servo pattern enables designation of sectors, sector headers, and the like of different lengths in different annular regions of the disk: surface. Also, in multiple disk surfaces drives, such checkerboard servo burst signal pattern enables a staggered sector format to be defined for the multiple disk surfaces of the drive.

The invented bootstrap method is implemented by a computer and/or microcode in an integrated circuit for establishing parallel and concentric signal tracks around a spinning disk surface of a disk drive magnetic data storage system using the magnetic transducer slider head of the drive positioned radially relative to the spinning surface by the drive's servo-responsive, precision actuator and servo controller, and has been described in context of both representative and preferred implementations which have reference to various electronic signal, various digital signal and various computation processing components. It should be recognized that such electronic, digital and computational processing components can be changed and/or modified by skilled engineers and designers for the purpose of simplifying or enhancing the versatility of the steps of the invented bootstrap method described above. While such simplifications and enhancements may not be exactly described herein, they will fall within the spirit and the scope of invention as described and set forth in the appended claims.

We claim:

1. A method for writing parallel and concentric magnetic signal tracks onto and around a spinning disk surface of a disk drive magnetic data storage system using the components of the drive system including its magnetic signal transducer slider head flying over its spinning disk surface for reading and writing magnetic signal to and from the spinning disk surface, its servo-responsive, precision actuator positioning the slider head at different radial positions over the spinning disk surface and a servo controller providing command signals energizing the precision actuator, a digital signal central processing unit (CPU) and a digital signal random access memory storage unit (RAM) comprising the steps of:

writing an initial magnetic signal track with undulating boundaries and a meandering center line relative to the axes of the spinning disk surface for one disk revolution plus;

reading the just written magnetic signal track;

creating, in RAM memory, a digitized position signal memory table;

storing in a row of the digitized position signal memory table an initial digital position signal representing amplitude of the signals read by the slider head from each of a plurality of sampling points around the just written track decreased by a specified pitch ratio;

servo positioning the slider head radially for reading magnetic signal at a reference edge of the just written track using target digital position signals derived from the memory table compared against digitized position signals read by the slider head for a plurality of disk revolutions wherein the target digital position signals are derived by:

(i) reading a position signal with the slider head reading the reference edge of the just written track for each sampling point;

(ii) generating digitized position signals representing the amplitude of the just read position signals for each of the plurality of sampling points for each disk revolution;

(iii) deriving a target digital position signal for each sampling point each disk revolution by averaging the just digitized position signals for each sampling point with the initial digital position signal and thereafter with a sum compiled from previously digitized position signals for that particular sampling point stored in the memory table;

comparing the just digitized position signals to the derived target digital position signals for each corresponding sampling point generating a comparison signal; and inputting the comparison signal to the servo controller to produce an input command servo signal for energizing the servo-responsive actuator for maintaining radial position of the slider head relative to the reference edge of the just written track; then writing a second magnetic signal track while servoing on the reference edge of the just written track; and repeating the preceding steps with the just written second magnetic signal track to write a third track and so on to the nth magnetic signal track, the second third . . . & nth track being parallel, concentric and overlapping by the specified pitch ratio.

2. The method of claim 1 further including the steps immediately preceding writing of the second magnetic signal track comprising:

a) normalizing command signals from the servo controller energizing the precision actuator such that variation in such command signals average a minimum, summing to zero over a disk revolution;

b) clamping progressively, in steps, magnitude of variation of such command signals from the servo controller over the course of a single disk revolution to zero;

c) allowing a coast condition for one disk revolution keeping variation in the command signals from the servo controller to the precision actuator at zero;

d) reading magnetic signals relative to the reference edge of the just written magnetic signal track with the slider head while coasting;

e) generating digital coast position signals representing the amplitude of the magnetic signals read by the slider head for each of the plurality of sampling points for each disk revolution;

f) creating and storing in second memory table in RAM the digital coast position signals for each of the plurality of sampling points;

g) repeating successively up to ten iterations of steps b through d adding the respective digital coast position signals for each sampling point to a sum of digital coast position signals corresponding to that sampling point in the second memory table;

h) computing an average digital coast position signal for each sampling point to provide a target digital position signal for each sampling point from the second memory table; and i) initiating servo positioning using the target digital position signals from the second memory table for maintaining radial position of the slider head relative to the reference edge of the just written track.

3. A method for writing checkerboard embedded servo burst patterns defining parallel and concentric data signal tracks onto and around a spinning disk surface capable of storing readable and erasable magnetic signal patterns using a slider head transducer capable of writing, reading and erasing such signal patterns to the spinning surface and positioned radially relative to the spinning surface by a precision servo-responsive actuator controlled by a proportional integral differential (PID) servo controller using a digital signal central processing unit CPU and a digital signal random access memory storage unit (RAM) which includes steps of:

a) writing a non-ideal initial magnetic signal onto the spinning disk surface to provide a reference edge stable enough to read and servo upon with the slider head;

b) generating an initial memory table in RAM of initial amplitude position signals either read at a plurality of sampling points for one disk revolution or estimated to represent a full on track signal amplitude multiplied by a track pitch ratio factor;

c) servo positioning to the reference edge of the just written track with the servo controller for a plurality of disk revolutions initially using the memory table to provide an initial amplitude position signal compared to signal read by the slider head from the just written track at corresponding sampling points for the first revolution and thereafter using an amplitude position signal compiled from an average of a plurality of signal amplitudes read at each particular sampling point compared to the amplitude of the signal read by the slider head from the just written track at that sample point;

d) establishing an integral value servo current command signal to the actuator, while servo positioning, where proportional and differential servo current command signals produced by the servo controller to the actuator sum to zero over one disk revolution;

e) reducing progressively the proportional and differential servo current command signals from the servo controller toward zero;

f) allowing the actuator to "coast" with only integral servo current command signal for up to one revolution of the disk surface;

g) generating a second table of amplitude position signals in memory of signals read using the "coast" period, and repeating steps e and f as needed to provide signal averaging, statistical cancellation of random noise and reinforcement of repeating signal content;

h) enabling full PID servo using the second table vs. amplitudes of signal read by the slider head, whereby, any position error command current signal from the servo controller to the actuator represents a response to random noise and random forces;

k) writing a first servo burst and timing magnetic signal pattern track with a reference edge exterior the reference edge of the initial track while servo positioning on the latter edge with full PID servo current command signal to the actuator using the second table vs. the amplitudes of signal read by the slider at each corresponding sampling point; and m) inhibiting writing if the position error command current signal to the servo controller exceeds a limit and then rewriting the track and individual sample points within the track as needed;

n) while still servo positioning per step (h), checking the newly written track for integrity and updating the initial memory table created at step (b); then o) repeating successively steps (b) through n as necessary to fill the spinning disk surface with a checkerboard pattern of at least four distinguishable servo burst and timing magnetic signals patterns where concentric data track center lines are defined for each two iterations of steps b through k after the initial magnetic signal track is written.

4. The method of claim 3, at step (c), servo positioning to the reference edge of the just written track with the servo controller for up to ten disk revolutions initially using the memory table of initial amplitude position signals averaged with and compared to signal read by the slider head from the just written track at corresponding sampling points for the first disk revolution and thereafter using an amplitude position signal compiled from an average of a plurality of signal amplitudes read at each particular sampling point compared to the amplitude of the signal read by the slider head from the just written track at that sample point.

5. The method of claim 3, at step (c), servo positioning to the reference edge of the just written track with the servo controller for up to ten disk revolutions initially using the memory table of initial amplitude position signals averaged with and compared to signal read by the slider head from the just written track at corresponding sampling points for the first revolution and thereafter using an amplitude position signal compiled from an average of less than ten signal amplitudes read at each particular sampling point compared to the amplitude of the signal read by the slider head from the just written track at that sample point.

6. The method of claim 3 before performing step (k) further including the step of writing alternate track segments with a magnetic signal input from CPU to the slider head for up to a full disk revolution while servoing on the reference edge of the initial track with full PID servo using the second table vs. the read amplitudes allowing the HDA actuator and spindle motor to quiet to a least energy state with full PID servo position control while writing a magnetic signal to the spinning disk surface; and then in the next disk revolution performing step (k).

7. The method of claim 6 where the limit specified at step (m) is an arbitrary limit chosen to preclude writing upon either large magnitude random electrical noise events and/or large magnitude random mechanical vibration events.

8. A method for writing a fiducial magnetic signal track onto and around a spinning disk surface of a magnetic data signal storage head disk assembly (HDA) concentric with spin axes of the spinning disk surface using a read write transducer slider head of the HDA, a precision actuator of the HDA which normally positions the slider head at different radial positions over the spinning disk surface, a servo controller which normally provides command signals energizing the precision actuator and a digital signal central processing unit (CPU) and a digital signal random access memory storage unit (RAM) comprising the steps of:

a) locating a magnetic signal, read/write, transducer slider head of the HDA at a radial position anywhere over the spinning surface of the disk at a quiet or least energy path by applying a D.C. current to the actuator positioning the slider head at a radial position over the spinning disk surface for offsetting fixed bias forces, and after allowing time for the system to quiet at that radial position:

(i) writing an initial non-ideal track for one disk revolution plus with A-type servo burst and timing magnetic signal pattern in a first segment of m alternate segment pairs;

(ii) positioning the slider head with the servo controller providing D.C. current only to the actuator for positioning the slider head over either an inside edge or an outside edge of the just written track controller using an estimated value for generating a comparison/demand signal to the servo controller;

(iii) reading sample signals from n sampling points of the just written one revolution plus track with the slider head;

(iv) generating and storing in memory an initial memory table of initial digital position signals each indicative of an amplitude of a sample signal read by the slider head;

(v) confirming that the initial memory table of initial digital position signals stored in memory has variation within response limits of a complete servo loop including the slider head, read channel including an analog-to-digital converter, servo controller and actuator of the HDA and the CPU, and RAM memory; and b) initiating full servo positioning of the slider head to the chosen edge of the just written track by comparing digitized sample point signals read by the slider indicative of signal amplitude at each particular sampling point with the initial digital position signal corresponding to that sampling point in the initial memory table generating comparison/demand signal from the CPU, servo position error command signal from the servo controller, and error correction current to the actuator for adjusting radial position of the slider head relative to and over the chosen track edge, whereby, AC components of error correction current to the actuator are minimized, averaging to zero;

c) clamping progressively through one disk revolution servo position error command signal producing A.C. components in the error correction current energizing the actuator toward and to zero; then d) allowing the slider head to "coast" through a following revolution with the servo position error command signal producing A.C. components in the error correction current energizing the actuator at zero; and e) generating and storing in memory a second memory table of coast digital position signals representing an amplitude of signal read by the slider head for each sample point during the "coast" revolution;

f) repeating steps (c) through (e) still using the initial memory table for servo positioning the slider head starting at different points in a disk revolution, and adding the generated coast digital position signal for each sampling point to the corresponding entry in the second memory table for a plurality of disk revolutions for: (i) averaging random and non-repeating variation; (ii) capturing repeating variation; and (iii) distributing and averaging drift induced errors, whereby, the second memory table provides a definition of (models) the edge of the just written track being servoed upon;

g) deriving an average coast digital position for each sampling point to provide a target digital position signal for each sampling point from the second memory table;

h) initiating servo positioning of the slider head on the chosen edge of the just written track by comparing digitized sample point signals read by the slider indicative of signal amplitude at each particular sample point with a target digital position signal corresponding to that sampling point derived from the second memory table for generating servo position error command signals to the actuator; and (i) check if magnitude of comparison/demand position signals from the CPU for a plurality of sampling points is at most equal to ($\leqq$) a specified limit L; and if greater than such specified limit L, (ii) set initial memory table equal to second memory table and repeat steps (c) through (h) successively re-establishing second memory table until average magnitude of comparison/demand position signals from CPU are at most equal to ($\leqq$) the specified limit L;

(iii) checking erasure in each remaining segment of the m alternate segment pairs by reading with the slider head determining presence and absence of magnetic signal in the second segments of the m alternative segment pairs and noting presence of signal in particular segments;

k) continuing servo positioning slider head as in step (h), and:

(i) writing magnetic signal into the remaining segments of the m alternate segments pairs for one disk revolution allowing time for recovery upon switching slider head from read status to write status; and during the immediately following disk revolution, (ii) writing a next track of B-type servo burst and timing magnetic signal pattern into the remaining segments of the m alternative segment pairs for one disk revolution, providing a reference edge extending radially, exterior the chosen edge of the initial written track;

(iii) reading with the slider head full on-track amplitude sample signal from n new sampling points of the track just written;

(iv) replacing entries in the initial memory table with new digital position signals each indicative of a current full on-track amplitude signal read from one of the n sampling points and multiplying each new table entry by a specified percentage "pitch ratio" $P_r$ reducing the amplitude of the indicated signal read to that anticipated if the slider head were moved that specified percentage out of registry with the just written track to obtain a new target digital position signal for each sampling point;

(v) calculating an on-track, track average signal amplitude, (TAA); and m) initiating full servo positioning of the slider head to the reference edge of the just written B-type servo burst and timing magnetic signal pattern track by comparing digitized sample point signals read by the slider head indicative of signal amplitude at each particular sample point with the new target digital position signal corresponding to that sampling point in the initial memory table for generating position error correction current to the actuator; and n) repeating steps (c) through (g);

o) normalizing the resulting average values for the coast digital position signals in the second memory table by summing a same offset value with each table value to obtain a derived average amplitude of a position signal indicated by such table of values equal to the on-track, track average amplitude, (TAA) calculated in Step (k)(v) multiplied by the pitch ratio $P_r$;

p) repeating steps (h) through (k)(i);

q) writing a next track of C-type servo burst and timing magnetic signal pattern into the first segments of the m alternative segment pairs for one disk revolution, providing a new reference edge extending exterior the reference edge of the previous track written at Step (k)(ii);

r) repeating steps (k)(iii) through (p);

s) writing a next track of D-type servo burst and timing magnetic signal pattern into the remaining segments of the m alternative segment pairs for one disk revolution, providing a new reference edge extending exterior the reference edge of the previous track written at Step (q);

whereby, an initial fiducial track center line concentric with the spin axes of the spinning disk surface is defined by the B-type servo burst and timing magnetic signal pattern track and D-type servo burst and timing magnetic signal pattern tracks written in the remaining segment of the m alternate segments pairs.

9. The method of claim 8 and further including after step (b) and in every subsequent iteration before step (c), the steps:

b)
   (i) adding each digitized sample signal read by the slider head at each sampling point to the corresponding digital position signal stored in the initial memory table for that sampling point; and (ii) deriving an average target digital position signal;

(iii) comparing each digitized sample point signal read by the slider head at each sampling point with the derived average target position signal corresponding to each particular sampling point generating comparison/demand signal from the CPU, servo position error command signal from the servo controller, and error correction current to the actuator for adjusting radial position of the slider head relative to and over a particular chosen and reference track edge each revolution of the disk for a plurality of disk revolutions, thereby, eliminating random variation and increasing resolution before initiating coasting of the slider head over the spinning disk surface.

10. The method of claim 9 at step (b)(iii), comparing each digitized sample point signal read by the slider head at each sampling point with the derived average target position signal corresponding to each particular sampling point generating comparison/demand signal from the CPU, servo position error command signal from the servo controller, and error correction current to the actuator for adjusting radial position of the slider head relative to and over a particular chosen and reference track edge each revolution of the disk for up to ten disk revolutions, thereby, eliminating random variation and increasing resolution before initiating coasting of the slider head over the spinning disk surface.

11. The method of claim 9 at step (e), generating a memory array in RAM and storing in each row of the array coast digital position signals from each of the sampling points for one "coast" revolution, whereby, each column of the memory array corresponds to a sampling point of the just written magnetic signal track; and at step (g), winnowing the rows of coast digital position signals of the memory array with a selection criteria and then deriving an average coast digital position signal for each sampling point to provide a target digital position signal for each sampling point by summing the columns of the winnowed rows of the memory array and dividing the sums obtained by the number of rows retaining in the memory array.

12. The method of claim 11 further including in step (g) before deriving an average coast digital position signal for each sampling point to provide a target digital position signal for sampling points the further step of winnowing the columns of coast digital position signals of the memory array with a selection criteria.

13. The method of claim 11 wherein the selection criteria winnowing the rows of coast digital position signals eliminates at least two rows by computing a measure of variation in amplitudes of indicated coast position signals for each coast revolution and discarding the rows having the maximum and the minimum measures of variation in signal amplitudes.

14. The method of claim 9 at step (e), generating a memory array in RAM and storing in each row of the array coast digital position signals from each of the sampling points for one "coast" revolution, whereby, each column of the memory array corresponds to a sampling point of the just written magnetic signal track; and at step (g), winnowing the columns of coast digital position signals of the memory array with a selection criteria and then deriving an average coast digital position signal for each sampling point to provide a target digital position signal for sampling points remaining after winnowing by summing the remaining columns of the memory array and dividing the sums obtained by the number of rows in the memory array.

15. The method of claim 14 wherein the selection criteria winnowing the columns of coast digital position signals eliminates at least two columns by computing a measure of variation in amplitudes of indicated coast position signals for each column and discarding the columns having the maximum and the minimum measures of variation in signal amplitudes.

16. The method of claim 8 at step (f), wherein steps (c) through (e) are repeated up to ten iterations.

17. The method of claim 8 and further including the step of:

A) initiating full servo positioning of the slider head to the reference edge of the last written track of D-type servo burst and timing magnetic signal pattern and successively repeating steps (h) through (s) alternately writing in each iteration at steps (k)(ii), (a) and (s) a next track of one of four distinguishable types of servo burst and a timing magnetic signal patterns, in succession, (A-type then, B-type, then C-type, then D-type servo burst and timing magnetic signal pattern) until the actuator encounters a physical radius stop, whereby, an annular region of the spinning disk surface between the initial fiducial track defined and one of two physical radius stops restricting radial translation of the slider head to the disk surface is filled with an interleaving checkerboard pattern of A-Type, B-type, C-type, and D-type servo burst and timing magnetic signal patterns alternately written in successive and interleaving tracks into the first and remaining segments of the m alternate segment pairs defining a plurality of parallel and concentric data tracks each with a center line defined between a first and third of every three interleaving distinguishable servo burst and timing magnetic signal pattern tracks after the initial non-ideal track written at step (a)(i).

18. The method of claim 17 and a next step of:

B) moving the slider head to and initiating servo positioning upon an edge opposite the reference edge of the first track of B-type servo burst and timing magnetic signal pattern written at step (k)(ii), and successively repeating steps (h) through (s) alternately writing in each iteration at steps (k)(ii), (q) and (s) a next track of one of four distinguishable types of servo burst and a timing magnetic signal patterns in a succession, writing A-type then, D-type, then C-type, then B-type servo burst and timing magnetic signal pattern until the actuator encounters the other physical radius stop, whereby, an annular region of the spinning disk surface between the initial fiducial track defined and the second of two physical radius stops restricting radial translation of the slider head to the disk surface is filled with an interleaving checkerboard pattern of A-Type, B-type, C-type, and D-type servo burst and timing magnetic signal patterns alternately written in successive and interleaving tracks into the first and remaining segments of the m alternate segment pairs defining a plurality of parallel and concentric data tracks each with a center line defined between a first and third of every three interleaving distinguishable servo burst and timing magnetic signal pattern tracks.

\* \* \* \* \*